United States Patent

Breswick

Patent Number: 6,154,233
Date of Patent: Nov. 28, 2000

[54] SYSTEM AND METHOD FOR SEPARATING RASTER DATA FOR PRINTING

[75] Inventor: Curt Paul Breswick, Georgetown, Ky.

[73] Assignee: Lexmark International, Inc., Lexington, Ky.

[21] Appl. No.: 09/294,916

[22] Filed: Apr. 19, 1999

[51] Int. Cl.⁷ .............................. B41J 2/145; B41J 2/15; B41J 29/38
[52] U.S. Cl. ................. 347/40; 347/12; 358/1.8
[58] Field of Search .................. 347/40, 14, 12; 400/124.01; 358/1.8, 114

[56] References Cited

U.S. PATENT DOCUMENTS

| | | |
|---|---|---|
| 5,469,198 | 11/1995 | Kadonaga . |
| 5,559,930 | 9/1996 | Cariffe et al. . |
| 5,574,832 | 11/1996 | Towery et al. . |
| 5,644,683 | 7/1997 | Ross et al. . |
| 5,692,108 | 11/1997 | Donahue . |
| 5,704,022 | 12/1997 | Ethington et al. . |
| 5,727,137 | 3/1998 | LeClair et al. . |
| 5,923,820 | 7/1999 | Cunnagin et al. .................. 395/108 |
| 5,930,466 | 7/1999 | Rademacher ...................... 395/114 |

Primary Examiner—Thinh Nguyen
Attorney, Agent, or Firm—Needle & Rosenberg, P.C.; D. Brent Lambert

[57] ABSTRACT

A system and method for printing an image on a recording medium using vertically aligned printhead having at least one vertical column of nozzles, the image being divided into rows and columns. A raster portion of the image data is selected. The raster data is sectioned into print sections, wherein each print section represents data for one column of nozzles during one scan of the printhead across the print medium. The print sections are grouped into print passes wherein each print pass represents one scan of the printhead across the print medium. Each print pass is rotated and sent to the appropriate channel for printing on the recording medium.

5 Claims, 4 Drawing Sheets

SYSTEM AND METHOD FOR SEPARATING RASTER DATA FOR PRINTING

BACKGROUND OF THE INVENTION

1. Field of the Invention

The present invention relates to a method of printing using an ink jet printer, and more particularly, to a method of separating raster data for printing using an ink jet printer.

2. Description of the Prior Art

Ink jet printers typically include a printhead which is carried by a carriage assembly which is moved in transverse directions across the print medium, relative to the advance direction of the print medium within the printer. For a mono-color printhead used to jet a single color ink onto the print medium, the printhead is scanned across the print medium in one transverse direction, advanced a distance corresponding to the height of the printhead, and scanned in a return direction back across the print medium in an opposite direction. Ink is jetted from the ink emitting orifices in the printhead as the printhead scans in the transverse directions across the print medium. An image area is defined via software which overlies the print medium. The image area includes a plurality of rows of pixel locations and a plurality of columns of pixel locations. As each ink emitting orifice is scanned across an associated pixel location on the image area, a determination is made as to whether ink is to be jetted from the associated ink emitting orifice onto the print medium at the selected pixel location. By sequentially scanning the printhead across the print medium and advancing the print medium during scans a distance corresponding to the height of the printhead, ink may be selectively jetted onto the print medium at any pixel location within the image area.

For multiple pass printing, full swaths of data to be printed are calculated and then the dots that are not to be printed are zeroed out. The disadvantages to this are that processing time and bandwidth are wasted by formatting bits that will later be zeroed out. For example, if 50% of the dots are known to be zero, the bus bandwidth is 50% greater than needed and more memory will have to be used to store the swath.

SUMMARY OF THE INVENTION

The present invention provides a system and method to reduce the processing time and bandwidth for multipass printing. Data to be printed is sectioned into print passes. The hardware ASIC sectioner divides the input raster data, which is usually multidimensional, into the number of sections and passes required for creating each swath.

For full color printing and maximum efficiency, the data is sectioned into color layers (number of drops per grid location). Each layer is separated into two parts because of the checkerboard pattern that is printed, and each print pass is further divided into two sections if the printer has two DMA channels, one for the left column of printhead nozzles and the other for the right column of printhead nozzles.

For example for 600 dpi printing 2 drop per pixel the raster data is separated into 2 layers*2 print passes/layer (i.e. 2 drops per pixel)*2 sections of data (i.e. one for each DMA channel)=8 sections. Since there are 2 DMA channels, there will be four print passes for the eight sections of data.

A translation table is used to section the raster data. This is performed by the ASIC Sectioner. Once the data is sectioned, it is rotated ninety degrees and sent to the DMA channel for printing.

DETAILED DESCRIPTION OF THE INVENTION

The description of this invention is given by way of examples. Although the examples are specific, the algorithm may be applied to different printhead configurations, different dimensions, and different layers. The system and method may be implemented in hardware or software.

Figure 1:
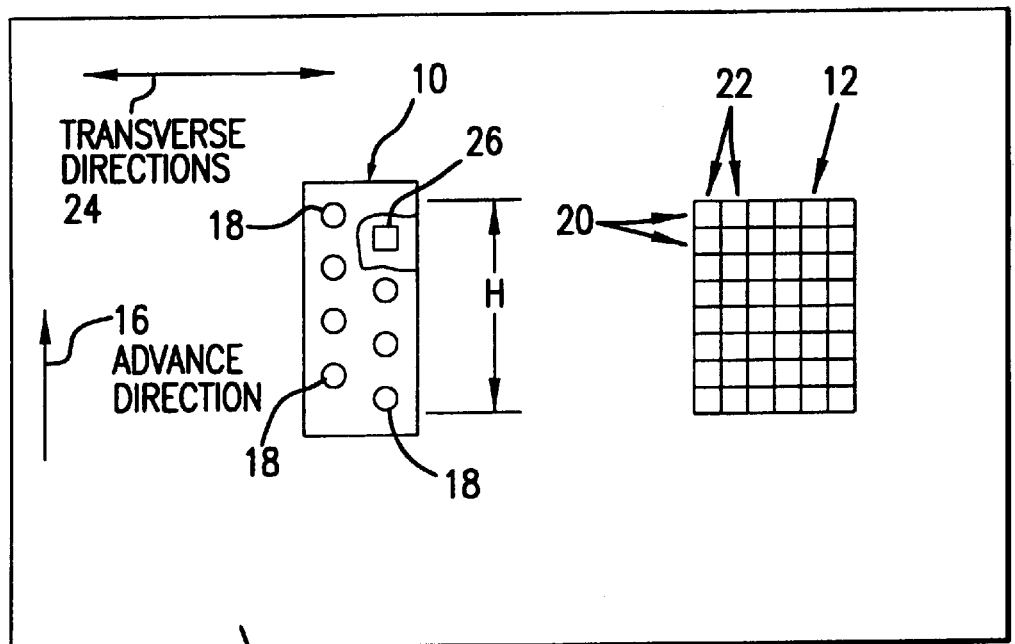
FIG. 1 is a schematic view of an exemplary printhead which may be used with the method of the present invention, shown in relationship to a portion of an image area on a print medium.

FIG. 1 shows a schematic view of an exemplary printhead 10 of an inkjet printer which may be used with the present invention, shown in relationship to a portion of an image area 12 on a print medium 14. Print medium 14 which may be a piece of paper, is movable in an advance direction within the inkjet printer, indicated by arrow 16.

Printhead 10 includes a plurality of ink emitting orifices 18 that are arranged in a vertical array. For manufacturing purposes, the vertically adjacent ink emitting orifices 18 are disposed in a staggered relationship relative to each other. That is, the bottom ink-emitting orifice 18 shown in the right hand column is disposed vertically adjacent to the bottom ink-emitting orifice shown in the left-hand column. In the embodiment shown, printhead 10 includes eight ink-emitting orifices which are arranged in a staggered and vertically adjacent relationship relative to each other. The array of eight ink emitting orifices 18 has a height H extending from the top-most ink emitting orifice 18 to the bottom-most ink emitting orifice 18.

Printhead 10 is carried in known manner by a carriage assembly which is movable in directions transverse to advance direction 16, as indicated by double-headed arrow 24. The carriage assembly and printhead 10 may be configured for single directional printing or bi-directional printing, in known manner.

Image area 12 overlying at least a portion of paper 14 is defined in part by the vertical spacing between adjacent ink emitting orifices 18. Image area 12 includes T plurality of rows of pixel locations 20 and a plurality of columns of pixel locations 22. Each pixel location within each row 20 of pixel locations has a height that corresponds to a height of an associated ink-emitting orifice 18 on printhead 10. Moreover, in the embodiment shown, each pixel location within each column 22 of pixel locations has a width that corresponds to the height dimension of each row 20. That is, each pixel location is substantially square. However, it is also to be understood that each pixel location may have a width which differs from the height, dependent upon the addressable resolution of the stepper motor which drives the carriage assembly carrying printhead 10.

Printhead 10 includes a plurality of ink jetting heaters, one of which is shown and referenced as 26 in FIG. 1, which are respectively associated with the plurality of ink emitting orifices 18. Each ink-jetting heater is actuatable at selected points in time during a scan of printhead 10 across paper 14 to jet the ink from an associated ink-emitting orifice 18. Actuation of an ink jetting heater 26 at a selected point in time causes the rapid formation of a bubble at the base of an associated ink emitting orifice 18, thereby jetting the ink onto paper 14 in known manner.

Figure 2:
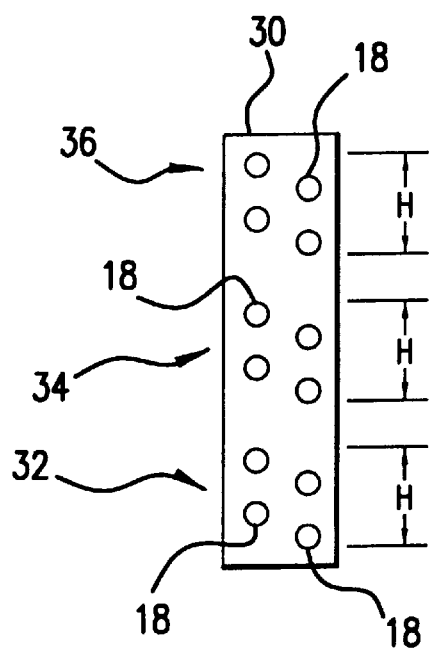
FIG. 2 is a schematic view of another exemplary printhead which may be used with the method of the present invention.

FIG. 2 is a schematic illustration of another exemplary printhead 30 that may be used with the method of the present invention. In contrast with printhead 10 shown in FIG. 1, printhead 30 shown in FIG. 2 includes three separate arrays 32, 34 and 36 of ink emitting orifices 18. Each array 32, 34 and 36 includes four ink-emitting orifices 18 which are disposed in a staggered and vertically adjacent relationship relative to each other. That is, the bottom-most ink emitting orifice 18 in the right hand column of array 32 is disposed staggered and vertically adjacent relative to the bottom-most ink emitting orifice in the left hand column of array 32. Each array 32, 34 and 36 of ink emitting orifices 18 has a common height H extending from an associate top-most ink emitting orifice 18 to a bottom-most ink emitting orifice 18. Array 32 is used to jet cyan ink onto paper 14; array 34 is used to jet yellow ink onto paper 14; and array 36 is used to jet magenta ink onto paper 14. Thus printhead 30 corresponds to a tri-color printhead used for carrying out multi-color printing. It will be appreciated that the number of ink emitting orifices 18 within each array 32, 34 and 36 may vary from that shown, and the physical position of the cyan, yellow and magenta arrays relative to each other may vary.

Terminology

Color Raster is the input data required to print a pel high (⅙₀₀") horizontal row on the paper. The input data may be multidimensional. For example, a 600 dpi 2-bit per pixel will have two rasters to represent a single color. The first bit of each raster, the most significant bit of the first byte of each raster, represents the two bits of the first pixel. The first raster is dimension one and the second raster is dimension two.

The number of bits per pixel determines the number of levels obtainable. The number of levels is 2 to the power of the number of bits per pixel.

Color Layer is the number of drops of color that will be placed on a pixel location. Some printers and printheads require two or more drops of the same color ink per 600 dpi pixel (or other defined area) for full coverage on most media. Since only a single drop at a time may be placed by the printhead, the input data is separated into parts or layers. Therefore, the number of layers is the maximum number of drops of a single color that will be placed at a pixel location. In addition, since some printhead configurations allow only to print half of the overall possible drops in each pass in a checkerboard pattern, we need four passes for full coverage printing.

Print passes are the number of passes the printhead passes over a section of the print medium. Some printhead configurations only print a checkerboard pattern at the given resolution in each pass. Since we may need to put two or more drops of a single color at each grid location for a given resolution, multiple passes may be required for full coverage printing. For example, if the printhead configuration can only print a checkerboard pattern in each pass, and two drops of a single color at each pixel location is required, then a total of four print passes are needed for full coverage printing. For example, to print a black and red checkerboard pattern, in the first pass, the first layer of the red squares of the checkerboard are printed (i.e. red squares are the even rows/even columns and odd rows/odd columns). In the second pass, the first layer of the black squares of the checkerboard are printed (i.e. black squares are the even rows/odd columns and odd rows/even columns). In pass three, the second layer of the red squares of the checkerboard are printed. In pass four, the black squares of the checkerboard are printed.

Many printheads are arranged with multiple columns of nozzles. Typically, a printhead will have two columns per color, as shown in FIG. 2, a left bank and a right bank. Each of these columns may have a separate DMA channel. Therefore, each pass of the printhead requires two sets of data per color, one for each DMA channel.

Color data may be sectioned. For example, suppose a printhead requires two layers (two drops) per grid location for full coverage, a checkerboard pattern is to be printed, and the printer has two DMA channels per color. For full coverage printing and maximum efficiency, the data is sectioned for each color as follows: Layers*2 (checkerboard)*2 (DMA channels). So for two layers there are 2*2*2=8 sections.

EXAMPLES

The following example illustrates how this invention is implemented for a printer with a 600 dpi base resolution. The example shown uses a hardware solution but the invention may also be implemented in software.

The hardware ASIC sectioner divides the input raster data, which is usually multidimensional into the number of sections required for creating the print swaths for each print pass. This allows the data to be easily rotated ninety degrees when the swaths are built.

For this example, the resolution may be 300 dpi or 600 dpi; the bits per pixel may be 1, 2, or 3; the maximum number of layers may be 1 to 3; the passes per layer may be 1 or 2.

A translation table is needed. Note that the translation table is not a fixed structure. It can be modified dynamically by programming different values to provide the best print quality and performance. For example, we may want to alter the table depending on the color ink that is being sectioned.

In the preferred embodiment, the translation table should specify the best way to put the ink on the paper to obtain the best quality. In general, the same number of drops should be put down on each pass of the head. Also, the drops put down in a single pass should be as far away as possible from each other. Also, when overlaying inks of different colors on the same print pass, the ratio of drops of different colors may be important depending on the color quality the user want to obtain. Translation tables are created by experimentation using prior knowledge and many print quality tests to determine the best combinations. Translation tables depend on properties of the ink, the size of the ink drops, the configuration of the printhead nozzles, and the speed and accuracy of the printer.

For each layer supported by a mode, the translation table specifies:

(1) If 600 dpi: For each layer, whether or not the 600 dpi area contains a drop;
(2) If 300 dpi: For each layer, whether or not each quadrant of the 300 dpi area contains a drop. Note that a quadrant of a 300 dpi area equals a 600 dpi area.

Table 1 is a translation table for 300 dpi, 2 bits/pixel, 2 layer, 4 passes. This translation table specifies if a drop will be printed in each 300 dpi quadrant of each layer. Note that the structure of the table tells the ASIC sectioner to divide the input data into eight sections, one for each layer and for each quadrant. To program the translation table requires four entries (one for each input level) of eight bits each or 32 bits total.

TABLE 1

Translation Table for 300 dpi, 2 bits/pixel, 2 layers, 4 passes

| Input Data | Layer 1 Q1 | Layer 1 Q2 | Layer 1 Q3 | Layer 1 Q4 | Layer 2 Q1 | Layer 2 Q2 | Layer 2 Q3 | Layer 2 Q4 |
|---|---|---|---|---|---|---|---|---|
| 00 | 0 | 0 | 0 | 0 | 0 | 0 | 0 | 0 |
| 01 | 0 | 0 | 0 | 0 | 0 | 0 | 0 | 1 |
| 10 | 1 | 0 | 1 | 0 | 0 | 1 | 0 | 0 |
| 11 | 1 | 1 | 1 | 1 | 1 | 1 | 1 | 1 |

Continuing the example, a two bits per pixel raster is input into the sectioner. Suppose the input is composed of two 16-bit halfwords, one halfword for dimension one, and the other halfword for dimension two. The sectioner would then calculate the output utilizing logical operations on data from the translation table to create eight output sections of sixteen bits each.

Suppose the input is:

Dimension 1: 0x359C=0011 0101 1001 1100
Dimension 2: 0x5BA6=0101 1011 1010 0110

The output would be as follows:

Layer 1, Q1=0011 0101 1001 1100 (DMA 1 first pass)
Layer 1, Q2=0001 0001 1000 0100 (DMA 1 second pass)
Layer 1, Q3=0011 0101 1001 1100 (DMA 2 first pass)
Layer 1, Q4=0001 0001 1000 0100 (DMA 2 second pass)
Layer 2, Q1=0001 0001 1000 0100 (DMA 1 third pass)
Layer 2, Q2=0011 0101 1001 1100 (DMA 2 third pass)
Layer 2, Q3=0001 0001 1000 0100 (DMA 1 fourth pass)
Layer 2, Q4=0101 1011 1010 0110 (DMA 2 fourth pass)

The output is calculated by reading from left to right the bits of dimension 1 and combining it with the same placed bit of dimension two. For example, the left most bit of dimension 1 is 0 and the left most bit of dimension 2 is 0. Therefore the input is 00. The input data 00 is matched with the data for level 1 and quadrant 1 in the translation table and a 0 is the output. The next bit from dimension 1 is a 0 and the next bit from dimension 2 is a 1. The input now is 01. This input is matched with level 1 and quadrant 1 in the translation table and a 0 is the output. Next, the input is a 1 and a 0 and the translation table shows that the output is a 1. This continues until all 16 bits for each layer and each quadrant are calculated. Note that each section of data would be in a separate print pass and/or DMA channel.

In another example, for 600 dpi, 2 layer, 4 pass printing, the input data needs to be divided into eight parts. The eight sections consist of four sections from the odd rasters and four sections from the even rasters. The ASIC sectioner will divide the input data for a single raster into four parts. The four parts are: (1) even columns, layer 1; (2) odd columns, layer 1; (3) even columns, layer 2; and (4) odd columns, layer 2.

The data input to the ASIC sectioner is a 2-bit per pixel raster, for example two 16-bit halfwords, one halfword for dimension one and one halfword for dimension two. The sectioner would then use logical operations on the translation table using the input data to create 4 output sections of one byte each. This is performed by the sectioner creating layer 1 and layer 2 using logical operations on the input data using the translation table. Then the layers are divided into even and odd columns.

Suppose the input is:

Dimension 1: 0x159B=0001 0101 1001 1101
Dimension 2: 0x4A22=0100 1010 0010 0010

The translation table is as follows:

| Level | L1 | L2 |
|---|---|---|
| 00 | 0 | 0 |
| 01 | 0 | 1 |
| 10 | 1 | 1 |
| 11 | X | X |

(Note: The 11 Level may not be used)

The output would be as follows:

Layer 1=0001 0101 1001 1101
Layer 1=0101 1111 1011 1111
Layer 1, Odd Columns=0000 1010
Layer 1, Even Columns=0111 0111
Layer 2, Odd Columns=0011 1111
Layer 2, Even Columns=1111 0111

Comparisons

This section will explain the traditional method that printers process raster data and compares this method with the method in the current invention.

System Assumptions

Suppose there is a single color printhead with 64 nozzles. For print quality, to reduce cockling, smearing and bleeding, the amount of ink that is placed on the media in one pass should be limited. Instead of printing every pixel, a checkerboard pattern is printed on the media. With a 64-nozzle head, two drops per pixel are required to completely cover a pixel location on the media. Since only a single drop may be placed on a pixel location in a single pass of the printhead, two passes of the printhead across the media is required. Since the printhead prints a checkerboard pattern in each pass; there are two drops per pixel location; and only a single drop of ink can be placed on a pixel location on each pass, four passes are required.

The input data is in 600 dpi rasters. Each raster contains data for a maximum of N pixels. Since the rasters are two-dimensional (recall that two drops per pixel location is required), each raster will have two bits per pixel, for a total of 2N bits or N/4 bytes.

The output data to the printhead is a swath. The swath contains all the printhead data for a single pass of the printhead. In this example, each swath contains data for each of the 64 nozzles and for every other pixel (since we are printing a checkerboard) so the size of each swath would be:

64 nozzles*N/2 pixels (checkerboard)=32N bits=4N bytes

Traditional Method

The printer electronics and firmware will manipulate the input data rasters into the output swaths. In the traditional method, when the printer receives raster data, it is stored in a large raster buffer. The buffer contains all the rasters required to build a swath. For multi-pass printing, a single swath will be used multiple times to build swaths. When a raster is no longer required for building swaths, it can be removed from the raster buffer. The traditional method of processing raster data also requires two swath buffers. A swath buffer contains the print data in a format that can be sent (DMAed) directly to the printheads. The data in the raster buffers must be formatted correctly before it can be placed into a swath buffer, and then the swath buffer data is sent to the printhead to be printed. This formatting usually includes rotating the data into the correct orientation for printing. While one swath buffer is being printed, the other swath buffer is being filled with the next swath data to be printed.

Figure 3:
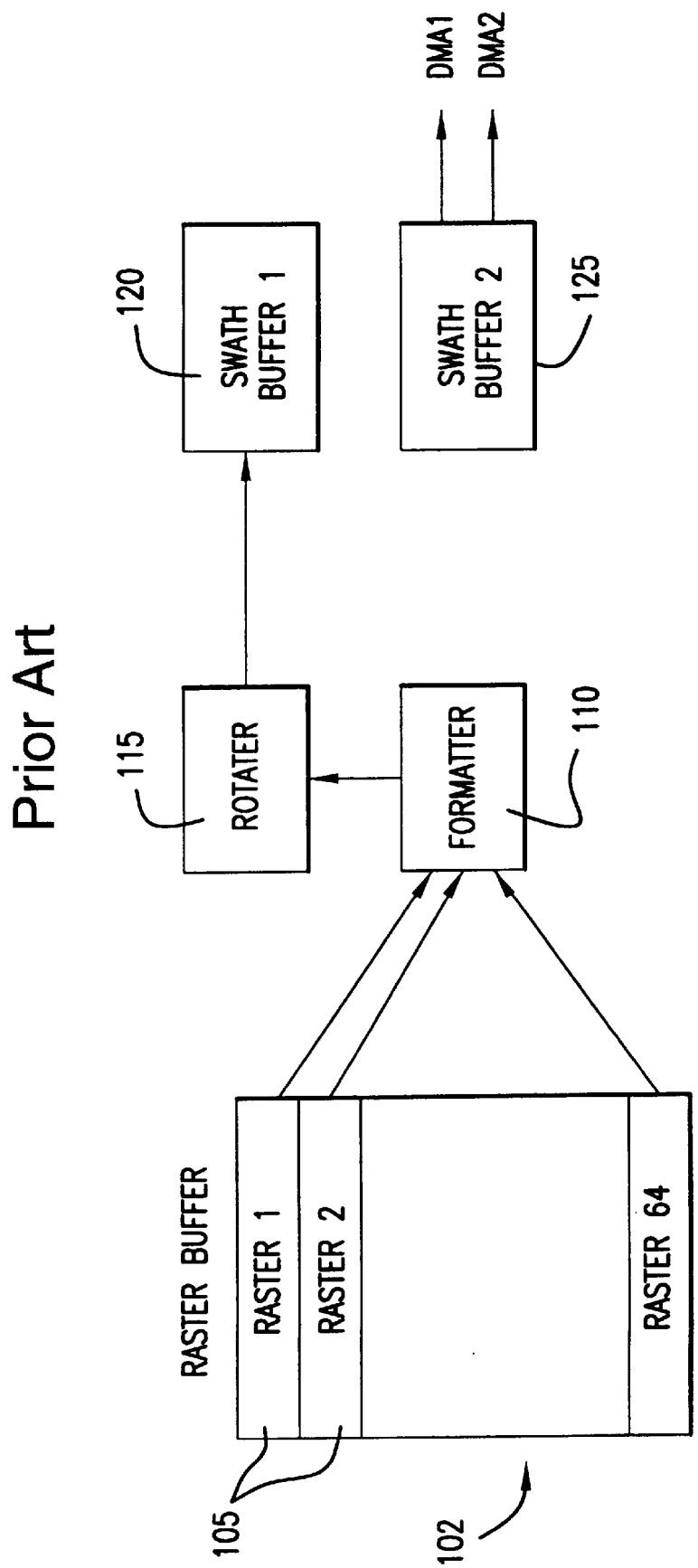
FIG. 3 is a block diagram of the traditional printer architecture.

As shown in FIG. 3, rasters 105 are stored in the raster buffer 102. All rasters that make up a swath are sent to the formatter 110. Once the rasters are formatted into a swath, the rotator 115 rotates the swath. The formatter 110 sends the formatted swath to the rotator 115. The rotator 115 rotates the swath and places it in swath buffer one 120. Once the swath has been formatted and rotated, it is printed. The swath located in swath buffer two 125 is ready to be printed in either DMA 1 or DMA2.

Recall that each swath contains data for each of the 64 nozzles, and for every other pixel (checkerboard pattern). The size of each swath is:

64 nozzles*N/2 pixels (checkerboard)=32N bits=4N bytes

Also recall that two swath buffers are needed, one for formatting and one for printing. Therefore 8N bytes are needed for the two buffers.

The raster buffer would need to contain at least 64 rasters since we need data from 64 rasters to create a swath. So the minimum raster buffer size is:

64 rasters*2N bits/raster=128N bits=16N bytes

The total amount of memory used in a traditional system is therefore:

2 swaths*4N bytes/swath+1 raster buffer*16N bytes/raster buffer=24N bytes

Figure 4:
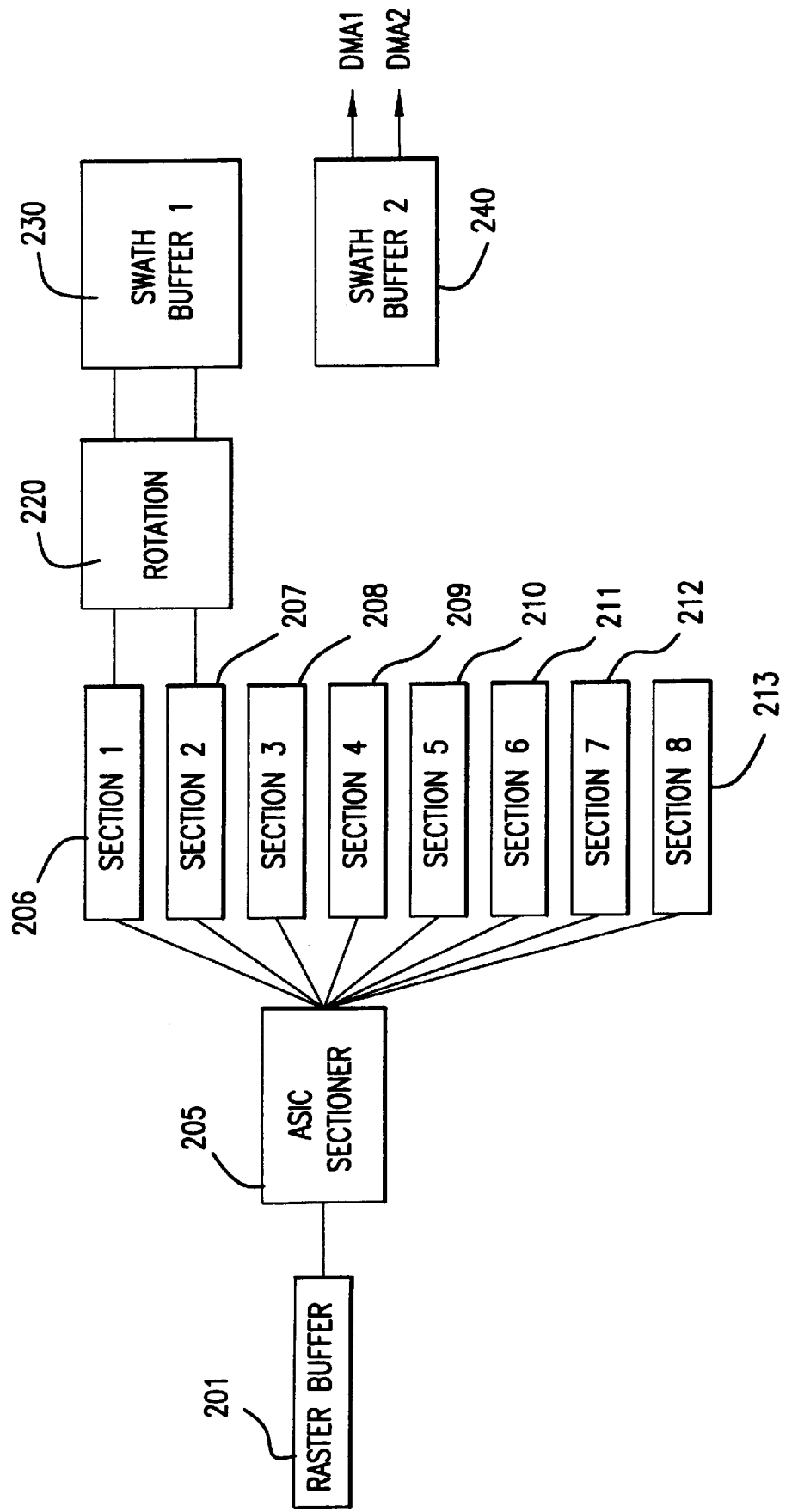
FIG. 4 is a block diagram of the sectioner architecture.
Figure 5:
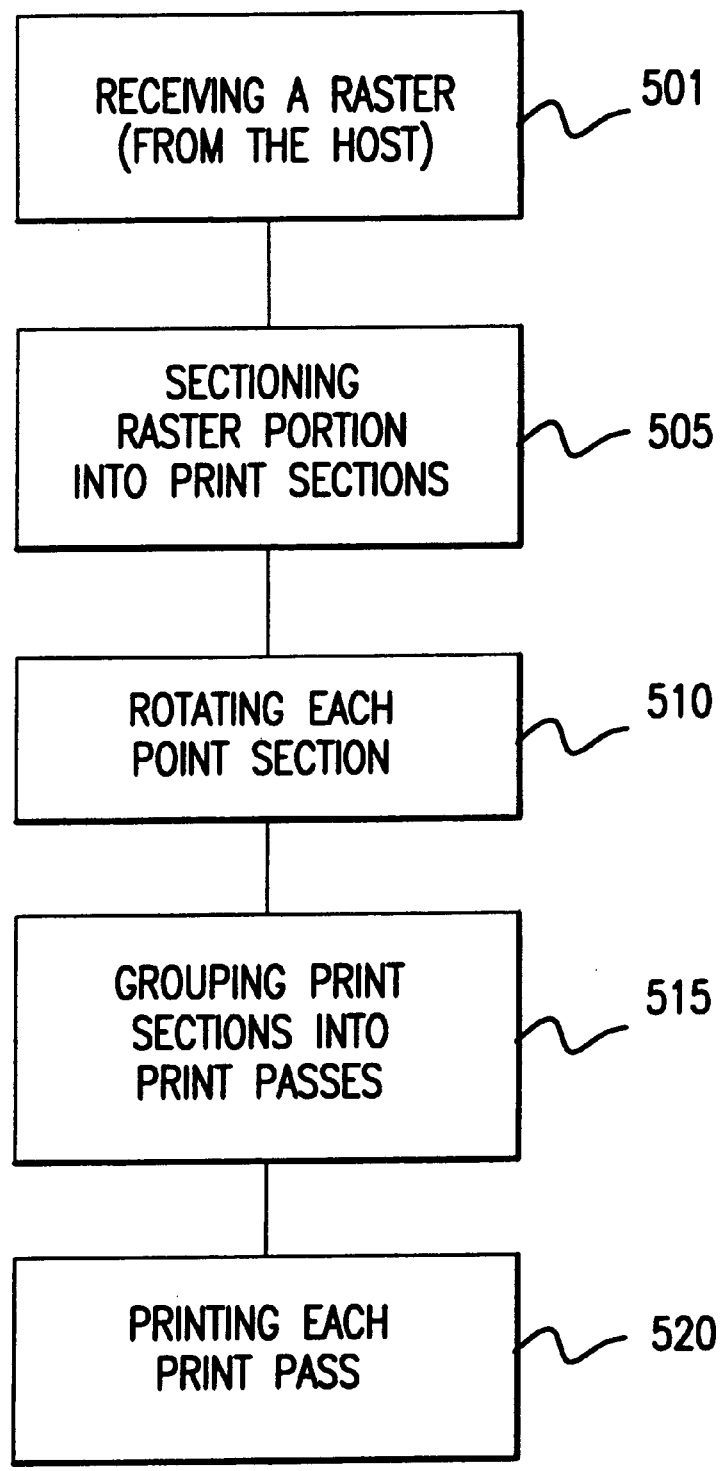
FIG. 5 is a flow diagram of the method for sectioning raster data.

In the traditional architecture, each raster is read four times, once for each swath. For each swath, only ¼ of the data read from the raster buffer is used. The unused bits must be zeroed out and discarded by the formatter 110. If each raster has 2N bits, the total amount of data transferred for building four swaths is:

Raster Buffer 102 to Formatter 110:
        2N bits/raster*64 rasters*4 times=512 N bits=64N bytes
    Formatter 110 to Rotator 115:
        (2N bits/raster*¼)*64 rasters*4=128N bits=16N bytes
    Rotator 115 to Swath Buffer 120:
        (2N bits/raster*4)*64 rasters*4=128N bits=16N bytes
    Total: 64N bytes+16N bytes+32N bytes=96N bytes New Method As shown in FIG. 4 and in FIG. 5, this section describes the new method to process raster data received from the host. When the printer receives raster data from the host at step 501, each raster is stored in raster buffer 201 in FIG. 4. The raster buffer 201 needs to be big enough for only one raster since the raster can be immediately sectioned at step 505 and stored in the appropriate sections 206–213. In the preferred embodiment, there are eight memory areas for the sections, 206–213. There are two memory sections; one for each DMA channel, for each of the four required passes of the printhead. There are enough sectioned rasters in each section for a single pass of the printhead. Each section can be rotated by the rotator 220 individually. The sections may be grouped into a print pass at step 515 and then DMA'ed directly to the printhead. As in the traditional system, this new method may also use two swath buffers 230, 240.

For this example, each swath would contain data for each of the 64 nozzles, and for every other pixel (checkerboard). The size of each swath would be:

64 nozzles*N/2 pixels (checkerboard)=32N bits=4N bytes

Two swath buffers are needed: one for printing and one for formatting the next swath to be printed. So a total of 8N bytes are needed for the two swaths.

The raster buffer need only contain one raster so the raster buffer size would be:

1 raster*2 N bits/raster=2N bits=N/4 bytes

Eight sections are required to store the sectioned data. Each section would contain enough memory for 32/4 rasters or 2N bytes:

8 sections*2N bytes=16N bytes

The total amount of memory used in the new system would be:

2 swaths*4N bytes/swath+1 raster buffer*N/4 bytes/raster buffer+8 sections*2N=24.25N bytes In the new method, each raster is read only once from the raster buffer. This is more efficient than the traditional architecture. The total amount of data transferred for four swaths is:

Raster Buffer 201 to Sectioner 205:
        2N bits/raster*64 rasters=128 N bits=16N bytes
    Sectioner 205 to Sections (206–215):
        2N bits/raster*64 rasters=128N bits=16N bytes
        Note: each section will contain 2N bytes
    Sectioner 205 to Rotater 220:
        2N bits/raster*64 rasters=128N bits=16N bytes
    Rotater 220 to Swath Buffer One 230
        2N bits/raster*64 rasters=128N bits=16N bytes
    Total:
        16N+16N+16N+16N=64 bytes The memory transfer required for this new method is much less than with the traditional architecture.

While the invention has been described in detail with specific reference to preferred embodiments thereof, it is understood that variations and modifications thereof may be made without departing from the spirit and scope of the invention.

What is claimed is:

1. A system for printing an image on a print medium using a vertically aligned printhead having at least one vertical column of nozzles, the printhead making at least one scan across the print medium to place at least one layer of ink on the print medium, the image being divided into rows and columns, the system comprising:

(a) means for selecting a raster portion of the image data, wherein the raster portion comprises image data sufficient to print a pel high horizontal row on the recording medium;

(b) means for sectioning the raster portion into print sections, wherein each print section represents data for the at least one column of nozzles during one scan of the printhead across the print medium for one layer, and the number of print sections equals the product of the number of layers and the number of columns of nozzles and the number of scans;

(c) means for rotating each print section ninety degrees;

(d) means for grouping the print sections into at least one print pass, wherein a print pass represents one scan of the printhead across the print medium; and (e) means for printing each print pass on the print medium using the vertically aligned printhead having at least one vertical column of nozzles.

2. The system of printing of claim 1 wherein the printhead has two vertical column of nozzles.

3. The system of printing of claim 1, wherein the means for sectioning the raster portion comprises translation tables.

4. A method for printing an image on a print medium using a vertically aligned printhead having at least one vertical column of nozzles, the printhead making at least one scan across the print medium to place at least one layer of ink on the print medium, the image being divided into rows and columns, the method comprising the steps of:

(a) selecting a raster portion of the image data, wherein the raster portion comprises image data sufficient to print a pel high horizontal row on the recording medium;

(b) sectioning the raster portion into print sections, wherein each print section represents data for the at least one column of nozzles during one scan of the printhead across the print medium for one layer, and the number of print sections equals the product of the number of layers and the number of columns of nozzles and the number of scans;

(c) rotating each print section ninety degrees;

(d) grouping the print sections into at least one print pass, wherein a print pass represents one scan of the printhead across the print medium; and (e) printing on the print medium each print pass using the vertically aligned printhead.

5. The method of printing of claim 4, wherein sectioning the raster portion comprises of translation tables.

* * * * *